United States Patent
Oishi et al.

(10) Patent No.: US 8,353,979 B2
(45) Date of Patent: Jan. 15, 2013

(54) HEAT RECOVERY APPARATUS AND HEAT RECOVERY METHOD

(75) Inventors: Tsuyoshi Oishi, Mihara (JP); Hiroshi Tanaka, Mihara (JP); Takahiko Endo, Mihara (JP); Masahiko Tatsumi, Amagasaki (JP); Yasuyuki Yagi, Amagasaki (JP)

(73) Assignees: Mitsubishi Heavy Industries, Ltd., Tokyo (JP); The Kansai Electric Power Co., Inc., Osaka-shi (JP)

( * ) Notice: Subject to any disclaimer, the term of this patent is extended or adjusted under 35 U.S.C. 154(b) by 282 days.

(21) Appl. No.: 12/754,741

(22) Filed: Apr. 6, 2010

(65) Prior Publication Data
US 2010/0258005 A1 Oct. 14, 2010

(30) Foreign Application Priority Data
Apr. 9, 2009 (JP) ................................. 2009-095034

(51) Int. Cl.
*B01D 53/14* (2006.01)
(52) U.S. Cl. ................ 95/183; 95/193; 95/209; 95/227; 95/228; 95/236
(58) Field of Classification Search .................... 95/156, 95/183, 193–194, 209, 227, 236; 96/234, 96/242
See application file for complete search history.

(56) References Cited

U.S. PATENT DOCUMENTS

| | | | | |
|---|---|---|---|---|
| 2,968,156 A | * | 1/1961 | Pacault et al. | 60/676 |
| 3,890,789 A | * | 6/1975 | Beckmann et al. | 60/659 |
| 6,764,530 B2 | * | 7/2004 | Iijima | 95/183 |

FOREIGN PATENT DOCUMENTS

| | | |
|---|---|---|
| JP | 56-13607 U | 2/1981 |
| JP | 3-193116 A | 8/1991 |
| JP | 5-184868 A | 7/1993 |
| JP | 10-202054 A | 8/1998 |
| JP | 2001-239129 A | 9/2001 |

OTHER PUBLICATIONS

Notice of Allowance dated Nov. 2, 2012, issued in corresponding Japanese Patent Application No. 2009-095034, with English translation (6 pages).
Japanese Office Action dated Sep. 4, 2012, issued in corresponding Japanese patent application No. 2009-095034, w/ English translation.

* cited by examiner

*Primary Examiner* — Duane Smith
*Assistant Examiner* — Ives Wu
(74) *Attorney, Agent, or Firm* — Westerman, Hattori, Daniels & Adrian, LLP

(57) ABSTRACT

A heat recovery apparatus, for an absorption apparatus for removing $CO_2$ in combustion exhaust gas emitted from a thermal power plant 112 and for regeneration apparatuses 104 to 107 for regenerating $CO_2$ in an absorbing liquid from the absorption apparatus, includes a regeneration-apparatus-exit-$CO_2$-gas cooling apparatus 100 for cooling $CO_2$ gas from an exhaust port of the regeneration apparatus, and may further include a circulation line 102 for circulating reflux water among boiler feedwater heaters 114 and 116 in the thermal power plant 112 and the regeneration-apparatus-exit-$CO_2$-gas cooling apparatus 100.

3 Claims, 3 Drawing Sheets

HEAT RECOVERY APPARATUS AND HEAT RECOVERY METHOD

BACKGROUND OF THE INVENTION

The present invention relates to a heat recovery apparatus and to a heat recovery method.

The greenhouse effect caused by $CO_2$ is recognized as a major cause of global warming phenomena. The warming adversely affects the global environment in a devastating way, causing serious results such as unusual weather, including heavy rainfall, flooding, and the like, sea-level rise due to disappearance of glaciers, and resultant submersion of islands. From such viewpoints, measures to reduce $CO_2$ emissions have internationally become an important and urgent issue.

Carbon dioxide is generated in any type of human activity that involves combustion of fossil fuels.

Accordingly, the following methods have been implemented in power generation facilities such as thermal power plants using large amounts of fossil fuels (coal and the like): one in which combustion exhaust gas of a boiler is brought into contact with an amine-based $CO_2$ absorbing liquid, and thus $CO_2$ in the combustion exhaust gas is removed and recovered; and another in which the $CO_2$ thus recovered is stored without being released to the atmosphere. For example, the recovered $CO_2$ is compressed in a $CO_2$ compressor, and it is then sent to a $CO_2$ storage site via a pipeline.

As the processes of removing and recovering $CO_2$ from combustion exhaust gas by use of the $CO_2$ absorbing liquid as described above, there may be employed a process in which combustion exhaust gas and the $CO_2$ absorbing liquid are brought into contact with each other in an adsorption tower, and a process in which the absorbing liquid having absorbed $CO_2$ is heated in a regeneration tower, to release $CO_2$, and simultaneously the absorbing liquid is regenerated and circulated back to the adsorption tower for reuse (Japanese Patent Application Publication No. Hei 10-202054).

Here, the $CO_2$-containing gas from the regeneration tower is heated, and thus, it has a temperature at or around 85° C. The present inventors have hypothesized that efficient recovery of the heat can improve power generation efficiency by at least 0.5%. Moreover, the temperature of the $CO_2$ gas is raised in a $CO_2$ compressor at the time of $CO_2$ compression. Hence, the present inventors have also considered that effective recovery of the heat can further improve power generation efficiency.

Specifically, a $CO_2$ recovery apparatus for a thermal power plant using coal or the like consumes a large amount of steam and a large amount of electricity, and hence causes a large reduction in power generation output. In addition, the $CO_2$ recovery apparatus itself generates a low level of but a large amount of heat as described above. Accordingly, the present inventors have considered that, in order to prevent reduction in power generation output as much as possible, it is important to increase the amount of the power generation by utilizing the amount of heat generated by the $CO_2$ recovery apparatus.

In accordance with this thinking, the present inventors have tried a system having a configuration shown in FIG. 3 (This configuration is not known to the public and is novel over the conventional art).

In a heat recovery apparatus 200 according to this configuration, a boiler feedwater heater 202 is provided upstream of a regeneration tower condenser 204 as in the current situation, and boiler feedwater from a thermal power plant 206 is supplied to the boiler feedwater heater 202 for cooling regeneration-tower-exit $CO_2$ gas. Then, a method is employed in which the boiler feedwater is heated simultaneously with this cooling, and the heated liquid is returned to the thermal power plant 206. Before returned to the power plant, the heated liquid is caused to pass through a feedwater heater of a $CO_2$ compressor, is further heated in the feedwater heater, and is then returned. Thereby, the amount of heat recovered is increased.

Note that the cooled regeneration-tower-exit $CO_2$ gas is recovered as a product $CO_2$ through a regeneration tower reflux drum 208. Moreover, water is recovered by a regeneration tower reflux pump 210 through a bottom portion of the regeneration tower reflux drum 208, and is refluxed to the regeneration tower as reflux water.

However, it turned out that this trial configuration has the following drawbacks and hence is not economical.

(1) Since it is necessary to send a large amount of flow (the entire amount of the boiler feedwater) to the boiler feedwater heater 202 for the effective recovery of heat, considerable modifications of the thermal power plant 206 are necessary.

(2) In a $CO_2$ recovery apparatus for a large-scale coal thermal power plant, the number of heat exchangers increases, and pipes and the like increase, bringing about a problem regarding space limitation. Therefore, it is difficult to install such a $CO_2$ recovery apparatus in an ordinary thermal power plant.

(3) The greater the amount of heat the boiler feedwater recovers from tower top $CO_2$ gas of a regeneration tower, the more economical it is. However, because of the limitation of layout, it is practically impossible under the current situation to install multiple shell and tube type heat exchangers as the boiler feedwater heater 202.

(4) Moreover, pressure loss on a $CO_2$ gas side in the boiler feedwater heater 202 becomes excessively large. Suppose a case in which trouble occurs in the feedwater heater of a $CO_2$ compressor when heat of compression of $CO_2$ in the $CO_2$ compressor is recovered. In such a case, since the pressure of the $CO_2$ gas is higher than the pressure of the boiler feedwater, there is a concern that the $CO_2$ leaks, and exerts a significant effect on the operation of the power plant.

The present inventors have further researched in order to effectively recover heat of the $CO_2$-regeneration-tower-exit $CO_2$ gas and to increase an output of a turbine in a thermal power plant without causing such problems.

SUMMARY OF THE INVENTION

An object of the present invention is to provide a heat recovery apparatus and a heat recovery method that are capable of effectively recovering heat from $CO_2$-regeneration-tower-exit $CO_2$ gas, and increasing an output of a turbine in a thermal power plant.

In order to solve the above problems, an aspect of the present invention is a heat recovery apparatus provided to an absorption apparatus for removing $CO_2$ in combustion exhaust gas emitted from a thermal power plant and to a regeneration apparatus for regenerating $CO_2$ in an absorbing liquid from the absorption apparatus, the heat recovery apparatus including: a regeneration-apparatus-exit-$CO_2$-gas cooling apparatus for cooling $CO_2$ gas from an exhaust port of the regeneration apparatus; and a circulation line for circulating reflux water between a boiler feedwater heater in the thermal power plant and the regeneration-apparatus-exit-$CO_2$-gas cooling apparatus.

Here, in a general form of implementation, the absorption apparatus is an absorption tower, the regeneration apparatus is a regeneration tower, and the regeneration-apparatus-exit-$CO_2$-gas cooling apparatus is a regeneration-tower-exit-$CO_2$-gas cooling apparatus.

Therefore, in an embodiment of the present invention, an aspect of the present invention is a heat recovery apparatus provided to an absorption tower for removing $CO_2$ in combustion exhaust gas emitted from a thermal power plant and to a regeneration tower for regenerating $CO_2$ in an absorbing liquid from the absorption tower, the heat recovery apparatus including: a regeneration-tower-exit-$CO_2$-gas cooling apparatus for cooling $CO_2$ gas from an exhaust port of the regeneration tower, and further a circulation line for circulating reflux water between a boiler feedwater heater in the thermal power plant and a regeneration-tower-exit-$CO_2$-gas cooling tower.

In addition, the heat recovery apparatus according to the present invention is configured in a preferred embodiment of the present invention in that the circulation line includes a bypass line, and when the bypass line is open, supply of reflux water to the thermal power plant is stopped.

In order to solve the above problems, another aspect of the present invention is a heat recovery method, including the steps of: causing an absorbing liquid in an absorption apparatus to absorb $CO_2$ in combustion exhaust gas emitted from a thermal power plant, thereby removing the $CO_2$; regenerating $CO_2$ in the absorbing liquid from the absorption apparatus in a regeneration apparatus; supplying $CO_2$ gas at an exhaust port of the regeneration apparatus to a regeneration-apparatus-exit-$CO_2$-gas cooling apparatus, thereby cooling the $CO_2$ gas; and sending reflux water from the regeneration-apparatus-exit-$CO_2$-gas cooling apparatus to a boiler feedwater heater in the thermal power plant, thereby heating boiler feedwater.

Here, in a general form of implementation, the absorption apparatus is an adsorption tower, the regeneration apparatus is a regeneration tower, and the regeneration-apparatus-exit-$CO_2$-gas cooling apparatus is a regeneration-tower-exit-$CO_2$-gas cooling tower.

Therefore, in an embodiment of the present invention, an aspect of the heat recovery method according to the present invention is to include the steps of: causing an absorbing liquid in an absorption tower to absorb $CO_2$ in combustion exhaust gas emitted from a thermal power plant, thereby removing the $CO_2$; regenerating $CO_2$ in the absorbing liquid from the absorption tower in a regeneration tower, supplying $CO_2$ gas at an exhaust port of the regeneration tower to a regeneration-tower-exit-$CO_2$-gas cooling tower, thereby cooling the $CO_2$ gas, and sending reflux water from the regeneration-tower-exit-$CO_2$-gas cooling tower to a boiler feedwater heater in the thermal power plant, thereby heating boiler feedwater.

The present invention provides a heat recovery apparatus and a heat recovery method which are capable of effectively recovering heat from $CO_2$-regeneration-tower-exit $CO_2$ gas, and increasing an output of a turbine in a thermal power plant.

DETAILED DESCRIPTION OF THE PREFERRED EMBODIMENT

Hereinafter, a heat recovery apparatus and a heat recovery method according to the present invention will be described with reference to embodiments shown in the attached drawings.

Figure 1:
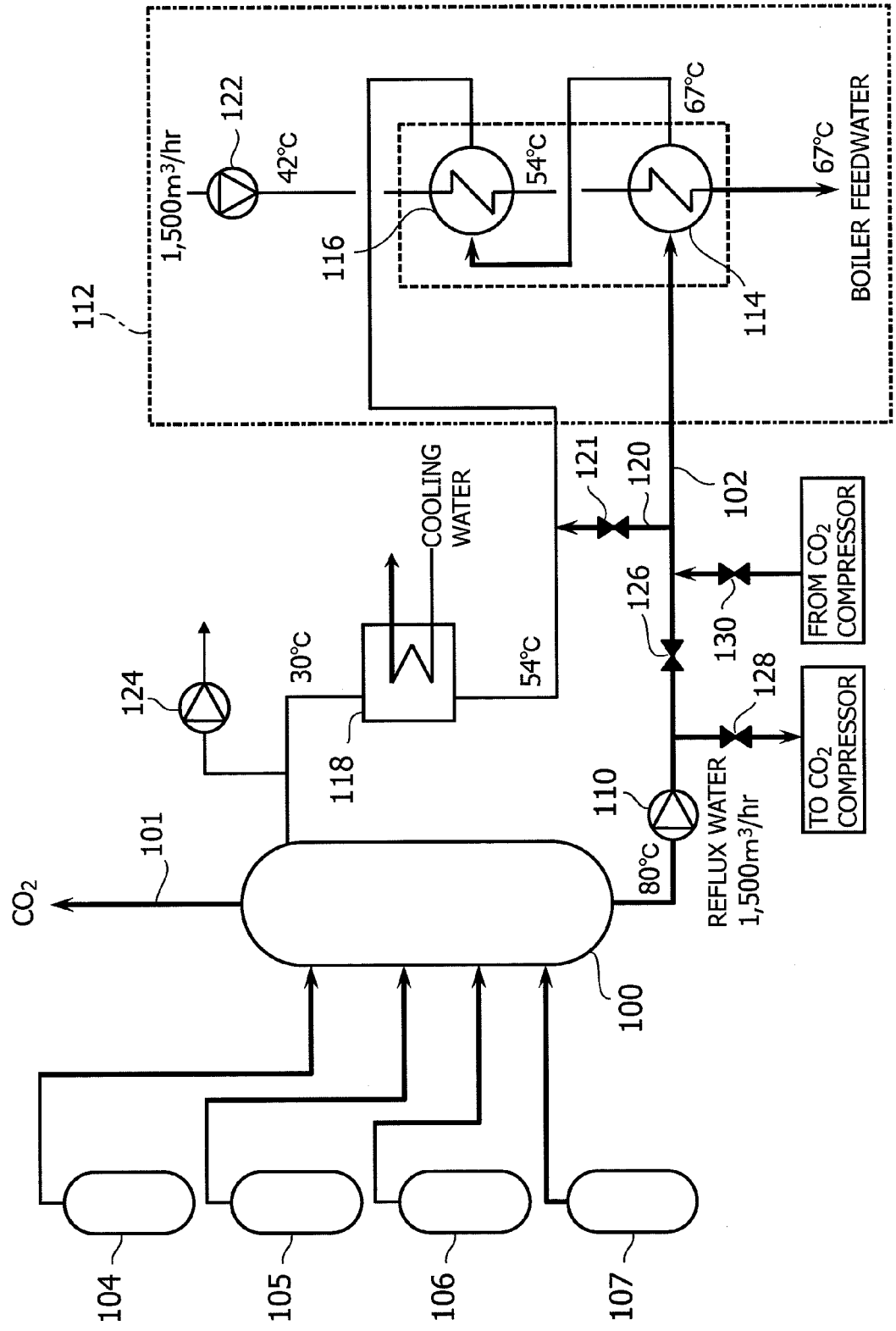
FIG. 1 is a schematic diagram for describing an outline of a heat recovery apparatus according to the present invention.

FIG. 1 shows an embodiment of the heat recovery apparatus according to the present invention.

The heat recovery apparatus according to the present invention includes a regeneration-tower-exit-$CO_2$-gas cooling tower 100 and a circulation line 102, as essential components. In the following description, the regeneration-tower-exit-$CO_2$-gas cooling tower 100 may be also referred to as a $CO_2$ gas cooling tower 100.

In this embodiment, the $CO_2$ gas cooling tower 100 is supplied with regeneration-tower-exit $CO_2$ gas (hereinafter also referred to as $CO_2$ gas) from four lines of regeneration towers 104 to 107.

The $CO_2$ gas cooling tower 100 includes spray means, at an upper portion thereof, for supplying reflux water for cooling the regeneration-tower-exit $CO_2$ gas. Moreover, the $CO_2$ gas cooling tower 100 includes a packed portion (not shown) where the $CO_2$ gas exchanges heat with cooling water. The packed portion is provided at a middle portion of the $CO_2$ gas cooling tower 100. As a packing material packed in the packed portion, a granular material such as stainless steel 304 is preferable.

An exhaust line 101, through which cooled $CO_2$ gas is emitted, is provided at an upper portion of the $CO_2$ gas cooling tower 100.

A bottom portion of the $CO_2$ gas cooling tower 100 is connected to the circulation line 102.

The circulation line 102 is designed to pass through a cooling tower pump 110, a low pressure second feedwater heater 114 of a thermal power plant 112, a low pressure first feedwater heater 116 of the thermal power plant 112, and a circulating water cooler 118, and to lead to the $CO_2$ gas cooling tower 100. The reflux water from the $CO_2$ gas cooling tower 100 flows in the circulation line 102. Accordingly, the circulation line 102 is formed of piping having specifications which satisfy the purpose.

Note that the circulation line 102 includes a bypass line 120. In this configuration, when a valve 121 of the bypass line 120 is open, the supply of the reflux water to the thermal power plant 112 is stopped by closing a different valve (not shown).

Boiler feedwater to be used in the thermal power plant 112 flows in the low pressure second feedwater heater 114 and the low pressure first feedwater heater 116. Moreover, these heaters 114 and 116 are configured to allow the reflux water flowing in the circulation line 102 to exchange heat with the boiler feedwater. As each of the low pressure second feedwater heater 114 and the low pressure first feedwater heater 116, a one-pass shell-and-tube type heat exchanger is preferably used.

The heat recovery apparatus according to this embodiment is provided to an adsorption tower (not shown) for removing $CO_2$ in combustion exhaust gas emitted from the thermal power plant 112 and to regeneration towers 104 to 107 for regenerating $CO_2$ in the absorbing liquid from the adsorption tower.

In the adsorption tower, the combustion exhaust gas containing $CO_2$ and the $CO_2$ absorbing liquid are brought into contact with each other for removal of the $CO_2$. In the regeneration towers 104 to 107, the $CO_2$ absorbing liquid having absorbed $CO_2$ is heated for regeneration of the $CO_2$ gas.

The $CO_2$ absorbing liquid is not particularly limited, but examples thereof include alkanol amines and hindered amines having an alcoholic hydroxyl group.

Note that what is regenerated in the regeneration towers 104 to 107 is $CO_2$. However, the $CO_2$ contains water vapor and the like. Accordingly, in this description and the scope of claims, what is emitted from the regeneration towers 104 to 107 is referred to as regeneration-apparatus-exit $CO_2$ gas, regeneration-tower-exit $CO_2$ gas, or $CO_2$ gas.

Next, an embodiment of the heat recovery method according to the present invention will be described by describing operation of the heat recovery apparatus shown in FIG. 1.

First, in the regeneration towers 104 to 107, $CO_2$ is regenerated from the $CO_2$ absorbing liquid coming from the adsorption tower, as described above.

Then, exit $CO_2$ gas from the regeneration towers 104 to 107 is supplied to the $CO_2$ gas cooling tower 100.

In the $CO_2$ gas cooling tower 100, reflux water cooled to, for example, a temperature at or around 30° C. is sprayed from the upper portion of the $CO_2$ gas cooling tower 100 to the packed portion.

In the packed portion, $CO_2$ gas having a temperature at or around 85° C. exchanges heat with the reflux water. In other words, the $CO_2$ gas is directly cooled with the reflux water.

The cooled $CO_2$ gas ($CO_2$) is emitted through the exhaust line 101. Such $CO_2$ gas ($CO_2$) is generally compressed or liquefied, and it is then stored.

Meanwhile, the temperature of the reflux water after the heat exchange reaches a temperature at or around 80° C., and the reflux water after the heat exchange is sent to the thermal power plant 112 by the cooling tower pump 110.

Then, the reflux water is sent to the low pressure second feedwater heater 114, and heats boiler feedwater having been heated to a temperature at or around 54° C., to a temperature at or around 67° C. Then, the reflux water is further sent to the low pressure first feedwater heater 116, and heats boiler feedwater having a temperature at or around 42° C., to a temperature at or around 54° C. Note that the boiler feedwater is supplied to the heaters 114 and 116 by the feed pump 122.

Note that since the boiler feedwater heaters to which the reflux water is sent for heating the boiler feedwater may vary depending on the thermal power plant, it is preferable to select boiler feedwater heaters which achieve optimal temperature conditions for a thermal power plant.

Then, the reflux water cooled to a temperature at or around 54° C. is sent to a circulating water cooler 118, and it is further cooled to a temperature at or around 30° C. Note that this circulating water cooler 118 can be eliminated by adjusting conditions.

Thereafter, the cooled reflux water is supplied again as the reflux water from the upper portion of the $CO_2$ gas cooling tower 100.

In this embodiment, heat is recovered from the $CO_2$ gas by the reflux water circulating through the circulation line 102, as described above.

Note that excess water is removed by a reflux pump 124. Such water is mainly due to water vapor contained in the $CO_2$ gas.

In addition, the valve 121 on the bypass line 120 is opened depending on operational statuses of the thermal power plant and the like. In this event, the supply of the reflux water to the thermal power plant 112 is stopped by closing the different valve (not shown).

Thereby, with the bypass line 112 opened, the hot water can bypass the thermal power plant 112 when hot water is not allowed to be supplied to the low pressure feedwater heaters 114 and 116. As a result, flexible operation can be performed.

In this embodiment, it is assumed that the reflux water is circulated at 1,500 m³/hr, and that the same amount of the boiler feedwater is heated.

However, the present invention is not limited to such amounts of water. Moreover, although the above-described temperature conditions are preferable, they are shown merely as examples.

Note that, when the boiler feedwater is heated to 67° C. as in this embodiment, the turbine output is improved by 0.3%.

Meanwhile, when the amount of the reflux water is made the same as the amount of the boiler feedwater as in this embodiment, it is possible to raise the temperature of the boiler feedwater up to 75° C. by using an one-pass shell-and-tube type heat exchanger. In such a case, the turbine output is improved by 0.4%.

As can be understood from the embodiment in FIG. 1, even when the regeneration towers are in multiple lines (four lines), the $CO_2$ gas cooling tower is in one line in the present invention. Thereby, all regeneration-tower-exit gas can be sent to the lower portion of the $CO_2$ gas cooling tower. This greatly saves space.

Moreover, since the reflux water can be caused to flow on shell sides of the low pressure feedwater heaters 114 and 116, instead of heating steam, necessary alterations to the feedwater heaters can be minimized.

Moreover, in this case, there may be a concern that when the low pressure feedwater heater 114 or 116 breaks down, the reflux water containing amine will leak into the boiler feedwater and will contaminate the boiler feedwater. However, since the pressure of the reflux water can always be made lower than the pressure of the boiler feedwater, no reflux water will flow into the boiler feedwater even in the case of breakage. Hence, the boiler feedwater will never be contaminated with the reflux water.

Figure 3:
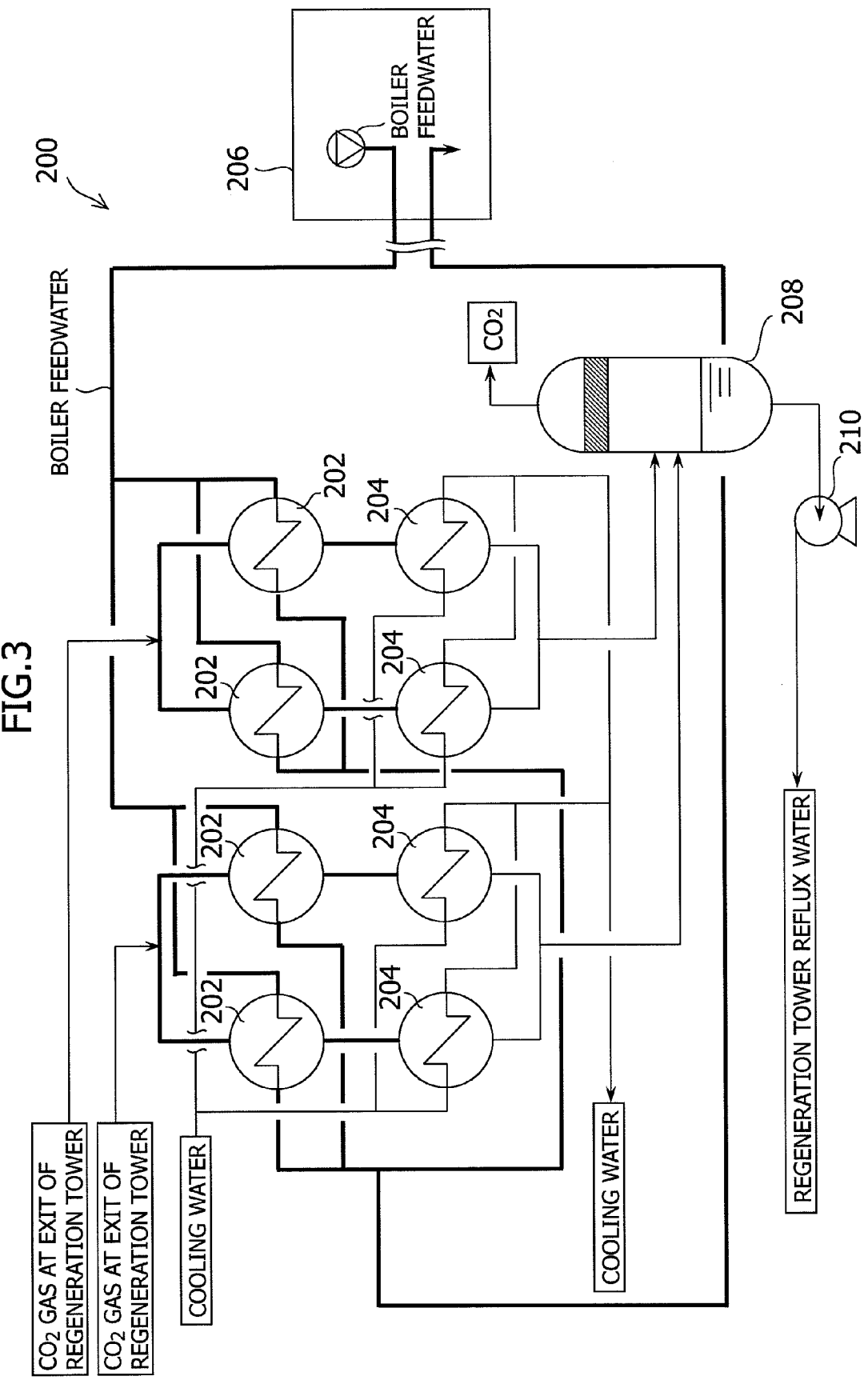
FIG. 3 is a schematic diagram for describing a trial configuration precedent to the present invention.

Moreover, unlike the trial configuration described with reference to FIG. 3, the present invention is advantageous in that all apparatuses can be installed in a small space because the number of apparatuses is reduced, and because a plate heat exchanger can be used as the circulating water cooler 118 for the $CO_2$ gas cooling tower.

Moreover, in the heat recovery apparatus according to this embodiment, pressure loss on the $CO_2$ gas side is significantly reduced (from 2000 mmAq to 200 mmAq). For this reason, when a $CO_2$ compressor inlet pressure is assumed to be the same, an operation pressure of the regeneration tower is reduced. As a result, water in the $CO_2$ gas is increased, which leads to increase in amount of heat recovered. Moreover, the loss of the absorbing liquid in the regeneration tower is reduced.

The $CO_2$ gas having passed through the regeneration towers 104 to 107, and exited from the $CO_2$ gas cooling tower 100 is usually sent to $CO_2$ compressors, in which pressure of the $CO_2$ is raised. The $CO_2$ compressors are arranged in 2 to 6 stages and compress the $CO_2$ gas. An intercooler is provided between each pair of stages, in order to cool $CO_2$ gas whose temperature has been raised by heat of compression in the compressors, and thereby to reduce power for compressing the $CO_2$ gas.

It is considered that an output of a power generator is increased by providing feedwater heaters upstream of the respective intercoolers, heating the boiler feedwater led from the thermal power plant 112 by the heat of compression of the $CO_2$, and returning the heated boiler feedwater to the power plant 112. However, pressures of the $CO_2$ gas entering the boiler feedwater heaters are 2 to 200 kg/cm²G, which are higher than the pressure of the boiler feedwater. Hence, when trouble such as corrosion occurs in the boiler feedwater heater, high pressure $CO_2$ gas leaks to the boiler feedwater, and this causes significant adverse effects on the thermal power plant 112. This results in reluctance to employ such a configuration.

Here, it is also possible to cause the reflux water at the exhaust port of the cooling tower pump 110 in the heat recovery apparatus according to FIG. 1 to flow through these feedwater heaters for the purpose of heating the reflux water, and to send the heated reflux water to the boiler feedwater heaters 114 and 116 in the thermal power plant 112.

In such a case, even when the $CO_2$ gas leak occurs in the feedwater heater, the $CO_2$ gas never contaminates the boiler feedwater for the thermal power plant 112. Hence, such a configuration can be employed.

Such a modification will be described with reference to FIG. 2 also. It is configured that the reflux water can be removed through a valve 128 to a $CO_2$ gas compression system shown in FIG. 2, and the reflux water can be returned from the $CO_2$ gas compression system shown in FIG. 2 through a valve 130, with a switch valve 126 shown in FIG. 1 interposed between these valves 128 and 130.

Figure 2:
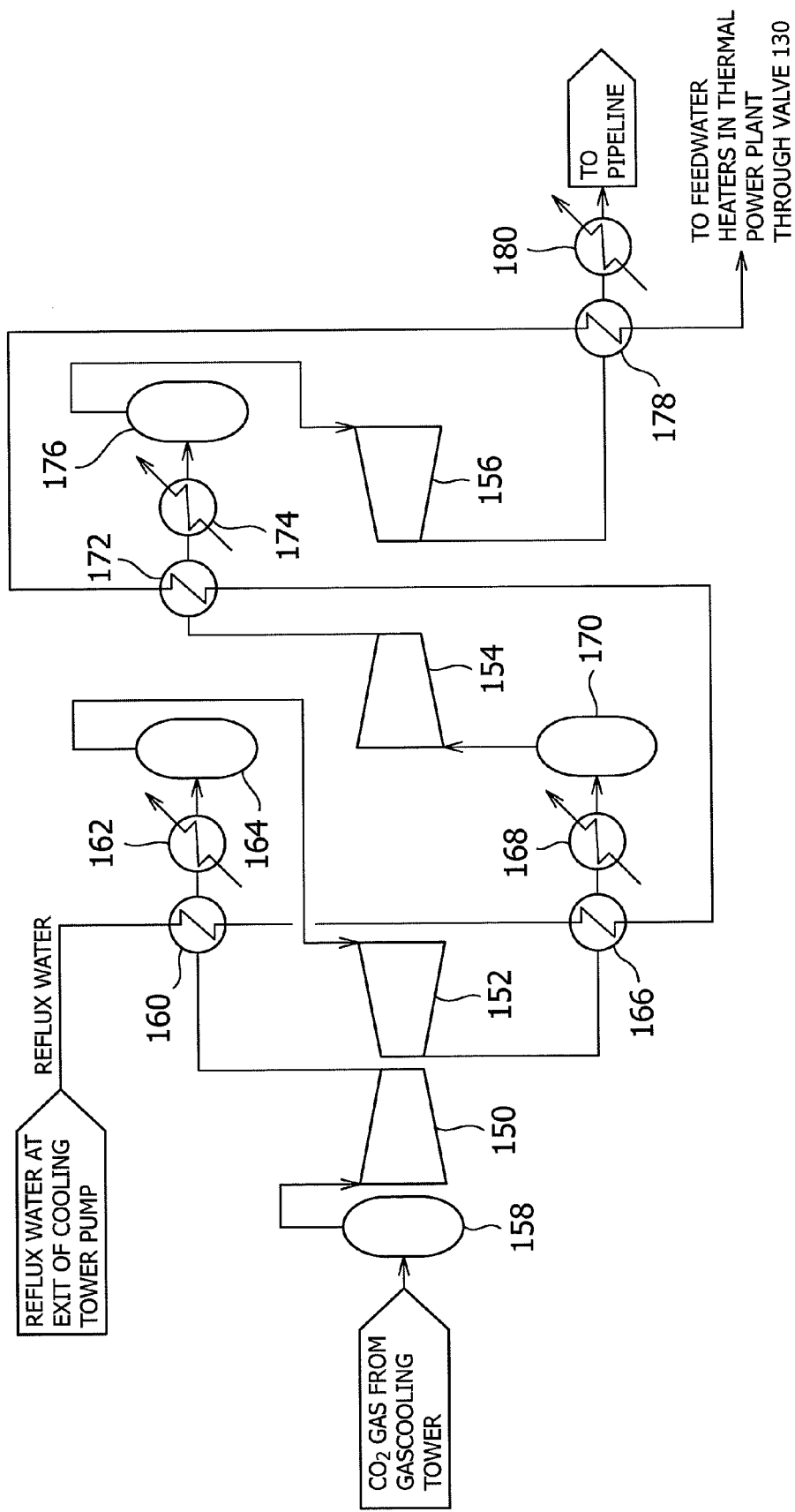
FIG. 2 is a schematic diagram for describing one embodiment of a $CO_2$ compression apparatus usable together with the heat recovery apparatus according to the present invention.

Closing the switch valve 126 and opening the valves 128 and 130 enables the reflux water to be sent to and heated in the $CO_2$ gas compression system in FIG. 2, and then the heated reflux water to be returned to the circulation line 102.

Opening the switch valve 126 and closing the valves 128 and 130 results in a state in which the reflux water is not sent to the $CO_2$ gas compression system.

The $CO_2$ gas compression system in FIG. 2 includes first to fourth stage $CO_2$ compressors 150, 152, 154 and 156.

Here, description will be given of operation of the $CO_2$ gas compression system in a state in which the switch valve 126 is closed, and the valves 128 and 130 are open.

The $CO_2$ gas removed through the line 101 (FIG. 1) at a tower top portion of the gas cooling tower 100 passes through a first drum 158, the first stage $CO_2$ compressor 150, a first reflux feedwater heater 160, a first intercooler 162, a second drum 164, the second stage $CO_2$ compressor 152, a second reflux feedwater heater 166, a second intercooler 168, a third drum 170, the third stage $CO_2$ compressor 154, a third reflux feedwater heater 172, a third intercooler 174, a fourth drum 176, the fourth stage $CO_2$ compressor 156, a fourth reflux feedwater heater 178, and a $CO_2$ product intercooler 180, and it is then sent to a pipeline side.

Meanwhile, the reflux water passes through a first reflux feedwater heater 160, a second reflux feedwater heater 166, a third reflux feedwater heater 172, and a fourth reflux feedwater heater 178 so as to be heated therein. Then, the heated reflux water is sent to the feedwater heaters in the thermal power plant 112 through the valve 130 (FIG. 1).

When the $CO_2$ gas is compressed to 80 kg/cm²G in the $CO_2$ gas compression system in FIG. 2, the temperature of the reflux water is further raised by 15° C. or more. This, together with the steam system, increases the output of the thermal power plant by 0.5% or more, and further reduces the amount of cooling water consumed.

Note that four stages of the $CO_2$ compressors are provided in this embodiment. However, it is only necessary to provide at least one stage of the $CO_2$ compressor. It is also possible to provide two stages, three stages, even five or more stages of the $CO_2$ compressors, as long as such a configuration fits operational conditions of the $CO_2$ gas compression system.

As can be understood from the embodiment described above, since the heat recovery apparatus according to the present invention transfers recovered heat by a liquid, the heat can be supplied to multiple heat exchangers in the thermal power plant. This increases the amount of heat usable to heat the boiler feedwater, thus leading to reduction in amount of cooling water in the entire system.

INDUSTRIAL APPLICABILITY

As has been described above, it is understood that the heat recovery apparatus and the heat recovery method according to the present invention achieve a preferable combination with heat integration in a thermal power plant, by directly cooling the $CO_2$ gas by using a $CO_2$ gas cooling tower (packed tower) capable of reducing pressure loss of $CO_2$ gas.

This provides a configuration of the circulation line capable of maximizing the amount of heat reusable in a thermal power plant. As a result, necessary alterations on the thermal power plant side are minimized, industrial applicability is ensured, and the amount of power generated by the thermal power plant can be increased The content of Japanese Patent Application No. 2009-095034, including the specification, the claims, the drawings and the abstract thereof is incorporated herein by reference in its entirety.

What is claimed is:

1. A heat recovery apparatus, for an absorption apparatus for removing $CO_2$ in combustion exhaust gas emitted from a thermal power plant and for a regeneration apparatus for regenerating $CO_2$ in an absorbing liquid from the absorption apparatus, comprising:
    a regeneration-apparatus-exit-$CO_2$-gas cooling apparatus for cooling $CO_2$ gas from an exhaust port of the regeneration apparatus; and
    a circulation line for circulating reflux water between a boiler feedwater heater in the thermal power plant and the regeneration-apparatus-exit-$CO_2$-gas cooling apparatus,
    wherein the circulation line comprises a bypass line, and when the bypass line is open, supply of reflux water to the thermal power plant is stopped.

2. The heat recovery apparatus according to claim 1, wherein reflux water at an exhaust port of the regeneration-apparatus-exit-$CO_2$-gas cooling apparatus is allowed to be sent to an $CO_2$ gas compression system including at least one stage of a $CO_2$ compressor, to pass through at least one reflux feedwater heater provided to the $CO_2$ gas compression system and be heated therein, and then to be returned to the circulation line.

3. A heat recovery method, comprising the steps of:
    causing an absorbing liquid in an absorption apparatus to absorb $CO_2$ in combustion exhaust gas emitted from a thermal power plant, thereby removing the $CO_2$;
    regenerating $CO_2$ in the absorbing liquid from the absorption apparatus in a regeneration apparatus;
    supplying $CO_2$ gas at an exhaust port of the regeneration apparatus to a regeneration-apparatus-exit-$CO_2$-gas cooling apparatus, thereby cooling the $CO_2$ gas; and
    sending reflux water from the regeneration-apparatus-exit-$CO_2$-gas cooling apparatus to a boiler feedwater heater in the thermal power plant, thereby heating boiler feedwater, wherein a circulation line to send reflux water to a boiler feedwater heater comprises a bypass line, and when the bypass line is open, supply of reflux water to the thermal power plant is stopped.

* * * * *